United States Patent

Boebel et al.

[15] 3,653,942

[45] Apr. 4, 1972

[54] METHOD OF CONTROLLING TEMPERATURE DISTRIBUTION OF A SPACECRAFT

[72] Inventors: Carl P. Boebel, Tipp City; Gary E. Stevenson, Xenia, both of Ohio

[73] Assignee: The United States of America as represented by the Secretary of the Air Force

[22] Filed: Apr. 28, 1970

[21] Appl. No.: 32,770

[52] U.S. Cl..........................117/33.3, 117/132 B, 117/137, 117/132 BE, 117/132 BS, 117/132 BF, 117/160 R, 165/133, 244/1 SS

[51] Int. Cl..........................................B44d 1/36, B64c 1/40

[58] Field of Search..............117/137, 31, 132, 33.3, 160 R; 161/171; 244/121, 133, 1 SS; 165/133; 126/270

[56] References Cited

UNITED STATES PATENTS

| | | | |
|---|---|---|---|
| 2,366,850 | 1/1945 | Gardner | 117/31 UX |
| 2,531,541 | 11/1950 | Spicer | 117/31 UX |
| 3,176,933 | 4/1965 | Clemmons | 244/1 |
| 3,129,703 | 4/1964 | Tabor | 126/270 |
| 2,530,217 | 11/1950 | Bain | 117/31 UX |
| 2,280,135 | 4/1942 | Ward | 117/31 X |
| 3,409,247 | 11/1968 | Pezdirtz | 244/1 |
| 3,351,504 | 11/1967 | De Hart | 117/31 X |
| 3,428,473 | 2/1969 | Langley | 244/1 UX |
| 3,548,930 | 12/1970 | Byrd | 244/1 X |
| 3,384,324 | 5/1968 | O'Sullivan | 165/133 X |

Primary Examiner—William D. Martin
Assistant Examiner—Harry J. Gwinnell
Attorney—Harry A. Herbert, Jr. and Cedric H. Kuhn

[57] ABSTRACT

A method of controlling the temperature distribution of a spacecraft is provided which comprises forming on at least a portion of the external surface of the spacecraft a coating comprising metal flakes embedded in a polymeric binder.

6 Claims, No Drawings

METHOD OF CONTROLLING TEMPERATURE DISTRIBUTION OF A SPACECRAFT

This invention relates to a method of controlling the temperature distribution of a spacecraft. In one aspect it relates to a substrate having a coating thereon that has a high solar absorptance to infrared emittance ratio.

The ability of a spacecraft to meet its design mission is inseparably linked with maintaining the temperature of its contents within the relatively narrow design limits in which they operate satisfactorily. The controlling element which determines the temperature of the vehicle is the ability of its external surface to exchange energy with its environment. The thermophysical properties of importance in controlling the surface temperature are (1) solar absorptance ($\alpha_s$), the fraction of incident solar energy which a surface absorbs, and (2) the infrared emittance ($\epsilon_{IR}$), the fraction of heat that a surface radiates compared to that which a blackbody would radiate at the same temperature.

One method of thermal control involves the concept of providing a solar absorber surface. Such surfaces absorb solar energy while emitting only a small percentage of the infrared energy. Thus, their $\alpha_s/\epsilon_{IR}$ ratios may be greater than unity which makes it possible to maintain surfaces at high temperatures while the craft is traveling through space. This is of great importance since it is necessary to maintain certain types of equipment associated with a spacecraft at a high temperature in order to ensure satisfactory operation.

In the past, solar absorber surfaces have been obtained by the use of polished metals, chemical conversion coatings, and thin film techniques, such as vacuum evaporation, sputtering, electron beam, and thermal decomposition of organo-metallic compounds. Another method involves pattern painting where the $\alpha_s/\epsilon_{IR}$ ratio can be varied by adjusting the percent of surface coverage by one coating system with a given set of optical properties over another coating system with vastly different optical properties. These techniques to obtain high $\alpha_s/\epsilon_{IR}$ ratios are limited from the standpoints of ease of application, especially to complex geometrical surfaces, maintenance and repairability, cost, and weight contribution.

The limitations listed in the preceding paragraph could be overcome or alleviated by the development of a suitable coating that could be applied as a paint. Paints containing a binder filled with aluminum powder having an $\alpha_s/\epsilon_{IR}$ ratio of 1.0 to 1.2 have been used for several years for satellite applications. The principal problems associated with metal pigmented paints with respect to obtaining higher $\alpha_s/\epsilon_{IR}$ ratios have been their low $\alpha_s$ values (0.25–0.40) and the fact that the polymeric binders absorb infrared energy, thereby causing high emittance values (0.40+). Commercially available paints containing metal particles other than aluminum, such as copper or bronze, may have high solar absorptance values, but their formulation is such that they do not have the necessary low emittance.

It is an object of this invention, therefore, to provide a method for forming a coating on a spacecraft surface that has a high $\alpha_s/\epsilon_{IR}$ ratio.

Another object of the invention is to provide low cost surface coatings for spacecraft that can be readily repaired and maintained.

Other and further objects and advantages of the invention will become apparent to those skilled in the art upon consideration of the following disclosure.

The present invention resides in a method for controlling the temperature distribution of a spacecraft which comprises (1) applying to a surface of the spacecraft a solution of a polymeric binder in a solvent for the binder, the solution having dispersed therein flakes of a metal or alloy, (2) evaporating the solvent from the solution, and (3) curing the polymeric binder with the flakes embedded therein. Upon application of the solution, the flakes float on top of the thin layer of the solution. As the solvent evaporates and curing of the binder takes place, the flakes become embedded in the binder in contiguous relationship with one another, thereby forming a substantially continuous layer of flakes. A very thin film of the polymeric binder covers the layer. The coatings prepared by this method are characterized by having high $\alpha_s/\epsilon_{IR}$ ratios.

It is usually preferred to use flakes of copper, iron, nickel, stainless steel, bronze or brass. The flakes, which are available from commercial sources, generally vary somewhat in size and are often irregular in shape. The flakes that are preferred for use are those having a diameter or width less than 150 microns, desirably in the range of 40 to 100 microns. The thickness of the flakes also varies, but it is usually in the range of about 0.25 to 2.5 microns.

The formulation, i.e., the polymer solution having metal or alloy flakes dispersed therein, that is applied to a surface of the spacecraft can be conveniently prepared by dissolving the polymeric binder in a solvent for the binder. Thereafter, the metal or alloy flakes are added to the solution. Prior to use the solution is stirred to ensure that the flakes are dispersed throughout the solution. A preferred mixing method involves adding the materials to a cylindrical glass container, closing the container with a Teflon cap, and then placing the container on a two-roll mill. Rotation of the rolls causes the container to revolve, thereby dispersing the flakes in the solution.

In general, any of the well-known resins, including those used in the paint art, can be employed as the polymeric binder in preparing the formulation. Examples of suitable binders include phenolic resins, such as phenol-formaldehyde, resorcinol-formaldehyde and phenol-furfural resins; epoxy resins, such as bisphenol A-epichlorohydrin resin; epoxy-novolak resins; polyorganosiloxanes, such as polymethylsiloxane and polyphenylsiloxane; acrylic resins, such as polyacrylonitrile and polymers of methyl methacrylate; alkyd resins, such as those prepared from phthalic anhydride, maleic anhydride or fumaric acid, and a polyhydric alcohol, such as glycerol, pentaerythritol or sorbitol; nitrocellulose plastics; terephthalate polyesters, such as polyethylene glycol terephthalate; vinyl polymers, such as polyvinyl chloride, polyvinyl acetate, polyvinyl aldehyde, and copolymers of vinyl chloride and vinyl acetate; and the like. It is to be understood that mixtures of resins can be utilized as the polymeric binder.

A number of solvents can be used in preparing the formulation of this invention. The solvent selected will depend upon the particular resin used as the binder, and such a selection is well within the skill of the art. Examples of suitable solvents include aliphatic hydrocarbons, such as pentane, hexane, and isooctane; cycloaliphatic hydrocarbons, such as cyclopentane and cyclohexane; aromatic hydrocarbons, such as benzene, toluene, and xylenes; alcohols, such as methanol, ethanol and butanol; ketones, such as acetone, methyl ethyl ketone, and methyl isobutyl ketone; acetates, such as vinyl acetate, Cellosolve acetate; and the like.

The amount of each component in the formulation can vary within rather broad ranges. Thus, the formulation can contain on a weight basis 3 to 80 percent metal or alloy flakes, 1 to 20 percent polymeric binder and 19 to 95 percent solvent. To obtain the highest $\alpha_s/\epsilon_{IR}$ ratios, it has been found that the amount by weight of the flakes must be greater than the amount by weight of the binder, preferably about 1.5 to 4.5 times greater. By using the higher proportions of flakes as compared to the binder, a minimum of the binder in the coating prepared by the method of this invention is exposed to infrared radiation. As a result the binder is substantially prevented from absorbing infrared energy which would otherwise increase the emittance values and concomitantly lower the $\alpha_s/\epsilon_{IR}$ values.

The formulation can be applied to the surface or portion of the surface of the spacecraft by brushing or spraying. However, it is preferred to spray the formulation since a more even coating is obtained and locations difficult to reach are more readily coated. Evaporation of the solvent and curing of the polymeric binder can be accomplished by merely allowing the coated specimen to remain at room temperature for a period of time sufficient for the solvent to evaporate and the coating to harden. The period can vary within rather wide limits, e.g., from about 8 to 48 hours and longer. The time necessary to evaporate the solvent and cure the polymer can be appreciably shortened by conducting the steps at an elevated temperature, e.g., from about 50° to 150° C. It is also within the purview of the invention to add a curing agent to the formulation. The actual curing agent used will depend upon the particular polymeric binder utilized in the formulation. For example, organotin compounds, such as tin octoate, can be employed as curing agents when a polyorganosiloxane is used as the binder. As another example, amine curing agents, e.g., di- or polyfunctional amines, can be used if the binder is an epoxy or an epoxy-novolak resin. The selection of a suitable curing agent for a particular polymer can be readily made by those skilled in the art.

As mentioned hereinbefore, the method of this invention makes it possible to provide coatings having high $\alpha_s/\epsilon_{IR}$ ratios. In general, the ratios vary from about 1.30 to 2.20 depending upon several factors, including the particular metal or alloy flake and polymeric binder used and the weight ratio of flakes to binder. The method of this invention with its capability of forming coatings having $\alpha_s/\epsilon_{IR}$ ratios in the indicated range makes it possible to control the temperature distribution of a spacecraft. Thus, the exchange of energy between the external surface of the spacecraft, or a desired portion thereof, with its environment can be controlled so as to maintain contents of the spacecraft within desired temperature limits.

A more complete understanding of the invention can be obtained by referring to the following illustrative examples which are not intended, however, to be unduly limitative of the invention.

EXAMPLE I

A series of five coating formulations was prepared by dissolving equal amounts by weight of a polyorganosiloxane and polymethylmethacrylate in xylene. To five cylindrical containers containing the solution, there was added copper flakes. The flakes had an average size of about 70 microns. The flakes were thoroughly dispersed in the solution by placing the capped containers on a two-roll roll mill and rotating them for an extended period of time. The following are the compositions of the formulation contained in the containers:

WEIGHT PERCENT

|  | A | B | C | D | E |
|---|---|---|---|---|---|
| Binder[1] | 0.96 | 4.2 | 7.1 | 2.0 | 1.4 |
| Copper flakes | 3.8 | 16.7 | 28.6 | 40.0 | 42.8 |
| Xylene | 95.2 | 79.1 | 64.3 | 58.0 | 55.7 |
| Totals: | 99.96 | 100.0 | 100.0 | 100.0 | 99.9 |

[1]Blend of 50 wt % polyorganosiloxane (General Electric SR82) and 50 wt % polymethylmethacrylate (Rohm and Haas B-66).

The formulations were sprayed on aluminum alloy panels. Evaporation of the solvent and curing of the polymeric binder were allowed to proceed at room temperature. Thereafter, the $\alpha_s$ and $\epsilon_{IR}$ values of the coatings were determined and the $\alpha_s/\epsilon_{IR}$ ratios computed. The results are shown below in Table I.

TABLE I

| Coating No. and Formulation | $\alpha_s$ | $\epsilon_{IR}$ at 75° F. | $\alpha_s/\epsilon_{IR}$ |
|---|---|---|---|
| 1-A | 0.40 | 0.19 | 2.10 |
| 2-B | 0.41 | 0.19 | 2.16 |
| 3-C | 0.43 | 0.20 | 2.15 |
| 4-D | 0.45 | 0.22 | 2.04 |
| 5-E | 0.43 | 0.22 | 1.95 |

The data in the foregoing table show that high $\alpha_s/\epsilon_{IR}$ ratios are obtained in accordance with the method of this invention when using formulations containing a wide range of percentages of copper flakes and binder. However, highest values were obtained when the weight ratio of copper flakes to binder was about 4 to 1.

EXAMPLE II

Formulations were prepared according to the procedure of Example I in which various metal and alloy flakes were used. The flakes had an average size of about 70 microns. The following are the compositions of the formulations:

WEIGHT PERCENT

| Binder[1] | 3.6 |
|---|---|
| Metal or alloy flakes | 5.6 |
| Lacquer thinner[2] | 90.8 |
| Total: | 100.0 |

(1) Nitrocellulose.

(2) 45 wt % amyl acetate, 5 wt % Cellosolve acetate, 5 wt % toluene, and 45 wt % methyl isobutyl ketone.

Coatings were prepared by spraying the formulations on aluminum alloy panels after which evaporation of the solvent (lacquer thinner) and curing of the binder were allowed to proceed at room temperature. Thereafter, properties of the coatings were determined as in Example I. The metal or alloy flakes used in the formulations as well as the properties of the coatings are shown below in Table II.

TABLE II

| Coating No. | Metal or alloy flakes | $\alpha_s$ | $\epsilon_{IR}$ at 75° F. | $\alpha_s/\epsilon_{IR}$ |
|---|---|---|---|---|
| 1 | Copper | 0.41 | 0.25 | 1.60 |
| 2 | Iron | 0.72 | 0.53 | 1.36 |
| 3 | Nickel | 0.62 | 0.43 | 1.44 |
| 4 | Stainless Steel | 0.62 | 0.40 | 1.55 |
| 5 | Brass | 0.37 | 0.21 | 1.76 |

The data in Table II demonstrate that the method of this invention is effective in producing high $\alpha_s/\epsilon_{IR}$ ratios, i.e., substantially greater than one, when using formulations containing different metals or an alloy in the form of flakes.

In the foregoing examples, solar absorptance ($\alpha_s$) was determined by use of a dual beam spectrophotometer with an absolute reflectance integrating sphere using a xenon energy source throughout the wavelength range. Calculation of the $\alpha_s$ of each coating involves a procedure of averaging the percent reflectance and 100 percent line values over a wavelength increment, then multiplying the reflectance by the percent solar intensity corresponding to this wavelength increment as defined by F. S. Johnson, "Satellite Environment Handbook," Stanford Press (1961). These values of reflected energy are summed up for each increment (a total of 25 points are used) to obtain the integrated solar reflectance, which is subtracted from 100 percent to obtain the solar absorptance. Magnesium oxide is used as the integrating sphere coating, but because of the sphere geometry and the dual beam of the spectrophotometer, an absolute reflectance value is obtained.

The total normal spectral emittance is calculated from 3 to 25 microns spectral reflectance data from a double beam spectrophotometer equipped with a hohlraum heated cavity. The reflectance values are corrected for both the zero and 100 percent datum lines. The 100 percent datum line is obtained using nickel oxide as the reference. The total emittance value of a given sample is calculated from the reflectance measurements and compared to a theoretical blackbody at a 75° F. surface temperature.

As will be evident to those skilled in the art, various modifications of this invention can be made or followed in the light of the foregoing disclosure and discussion without departing from the spirit or scope of the invention.

We claim:

1. A method of controlling the temperature distribution of a spacecraft which comprises:
   a. applying as a paint to a surface of said spacecraft a solution of a polymeric binder in a solvent therefor, said solution having dispersed therein flakes of a metal or alloy selected from the group consisting of copper, iron, nickel, stainless steel, bronze and brass and said solution comprising, on a weight basis, 1 to 20 percent polymeric binder, 19 to 95 percent solvent, and 3 to 80 percent metal or alloy flakes, the amount by weight of said flakes being greater than the amount by weight of said binder;
   b. evaporating said solvent from said solution; and
   c. curing said polymeric binder with said flakes embedded therein to provide on said surface a coating having a solar absorptance to infrared emittance ratio varying from about 1.30 to 2.20.

2. A method according to claim 1 in which said solution is applied to said surface by spraying thereon.

3. A method according to claim 1 in which the weight ratio of said flakes to said binder is in the range of about 1.5 to 4.5.

4. A method according to claim 1 in which said polymeric binder is selected from the group consisting of phenolic resins, epoxy resins, epoxy-novolak resins, poly organosiloxanes, acrylic resins, alkyd resins, nitrocellulose plastics, terephthalate polyesters, and vinyl polymers; and said solvent is selected from the group consisting of hydrocarbons, alcohols, ketones and acetates.

5. A spacecraft with at least a portion of its external surface having adhered thereto a coating having a solar absorptance to infrared emittance ratio varying from about 1.30 to 2.20, said coating comprising flakes of a metal or alloy selected from the group consisting of copper, iron, nickel, stainless steel, bronze and brass, and a cured polymeric binder, the weight ratio of flakes to binder being about 1.5 to 4.5, said flakes being embedded in said binder contiguous to one another so as to form a substantially continuous layer of flakes on said binder, and a thin film of said binder covering said layer.

6. The spacecraft according to claim 5 in which said coating consists essentially of said flakes and a polymeric binder selected from the group consisting of phenolic resins, epoxy resins, epoxy-novolak resins, polyorganosiloxanes, acrylic resins, alkyd resins, nitrocellulose plastics, terephthalate polyesters, and vinyl polymers.

* * * * *